(12) United States Patent
Simpson

(10) Patent No.: US 10,400,371 B2
(45) Date of Patent: Sep. 3, 2019

(54) LOW DENSITY CLOTH PREFORM AND METHODS OF MANUFACTURING SAME

(71) Applicant: BAM Inc., Knoxville, TN (US)

(72) Inventor: Allen Simpson, Buchanan, MI (US)

(73) Assignee: BAM Inc., Knoxville, TN (US)

( * ) Notice: Subject to any disclaimer, the term of this patent is extended or adjusted under 35 U.S.C. 154(b) by 393 days.

(21) Appl. No.: 14/894,517

(22) PCT Filed: May 31, 2014

(86) PCT No.: PCT/US2014/040425
§ 371 (c)(1),
(2) Date: Nov. 28, 2015

(87) PCT Pub. No.: WO2014/194307
PCT Pub. Date: Dec. 4, 2014

(65) Prior Publication Data
US 2016/0108567 A1    Apr. 21, 2016

Related U.S. Application Data

(60) Provisional application No. 61/829,653, filed on May 31, 2013.

(51) Int. Cl.
*D04H 1/46* (2012.01)
*D04H 18/02* (2012.01)
(Continued)

(52) U.S. Cl.
CPC ............... *D04H 1/46* (2013.01); *B29B 11/14* (2013.01); *B29B 11/16* (2013.01); *B29C 70/24* (2013.01);
(Continued)

(58) Field of Classification Search
CPC .......... D04H 18/02; D04H 1/46; D04H 3/102; D04H 3/105; D04H 13/005; D04H 5/02;
(Continued)

(56) References Cited

U.S. PATENT DOCUMENTS 4,955,123 A    9/1990  Lawton et al.
5,217,770 A  * 6/1993  Morris, Jr. .............. C04B 35/80
                                                         156/148
(Continued)

OTHER PUBLICATIONS

International Search Report and the Written Opinion of the International Searching Authority in PCT/US2014/040425 dated Sep. 9, 2014; 8 pages.

*Primary Examiner* — Amy Vanatta
(74) *Attorney, Agent, or Firm* — R. Stevan Coursey

(57) ABSTRACT

The disclosure describes a low density cloth preform, and apparatuses and methods for manufacturing the same. The low density cloth preform has a lower density than other preforms manufactured using prior apparatuses and methods, thereby rendering the low density cloth preform more amenable to the addition of matrix carbon thereto through the use of less expensive carbon sources and more rapid processes for adding matrix carbon. The apparatuses and methods for manufacturing the low density cloth preform comprise preform needling machines configured and preform needling processes operable to provide a more uniform and lesser needling depth with the result being a preform having a lower density. The preform needling machines utilize foam bases formed from resilient materials having appropriate rebound rates, arrangements of barbed needles in one or more groups and needling stages, and positioning of the barbed needles to minimize deflection of the foam bases and preform material.

6 Claims, 2 Drawing Sheets

(51) Int. Cl.
  *B29B 11/16* (2006.01)
  *B29C 70/24* (2006.01)
  *C04B 35/83* (2006.01)
  *B29B 11/14* (2006.01)
  *D04H 1/498* (2012.01)
  *B29L 31/16* (2006.01)
  *B29L 31/00* (2006.01)

(52) U.S. Cl.
  CPC .............. *C04B 35/83* (2013.01); *D04H 1/498* (2013.01); *D04H 18/02* (2013.01); *B29L 2031/16* (2013.01); *B29L 2031/7482* (2013.01)

(58) Field of Classification Search
  CPC ......... B29C 70/24; B29B 11/14; B29B 11/16; C04B 35/83; B29L 2031/7482; B29L 2031/16
  USPC .................................................... 28/107, 115
  See application file for complete search history.

(56) References Cited

U.S. PATENT DOCUMENTS

| | | | | |
|---|---|---|---|---|
| 5,388,320 | A | * | 2/1995 | Smith ..................... B29B 11/16 28/107 |
| 5,513,423 | A | * | 5/1996 | Jakob ..................... D04H 18/02 28/107 |
| 5,654,059 | A | | 8/1997 | Hecht |
| 5,758,394 | A | | 6/1998 | Linck et al. |
| 5,908,792 | A | | 6/1999 | Sheehan et al. |
| 6,009,605 | A | * | 1/2000 | Olry ....................... B29B 11/16 28/107 |
| 2010/0293769 | A1 | | 11/2010 | La Forest et al. |

\* cited by examiner

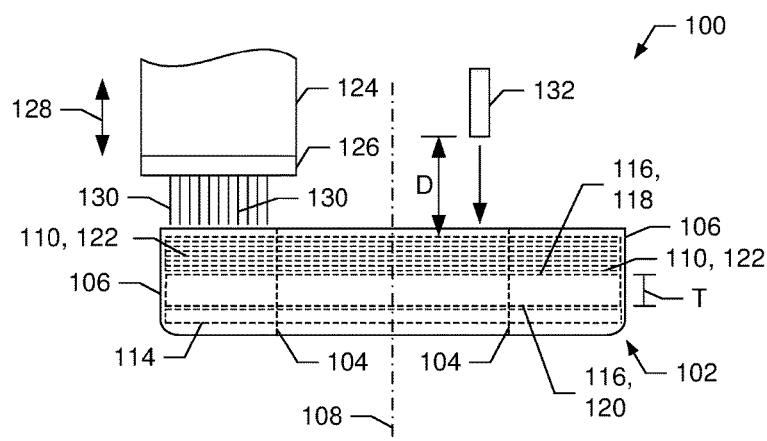
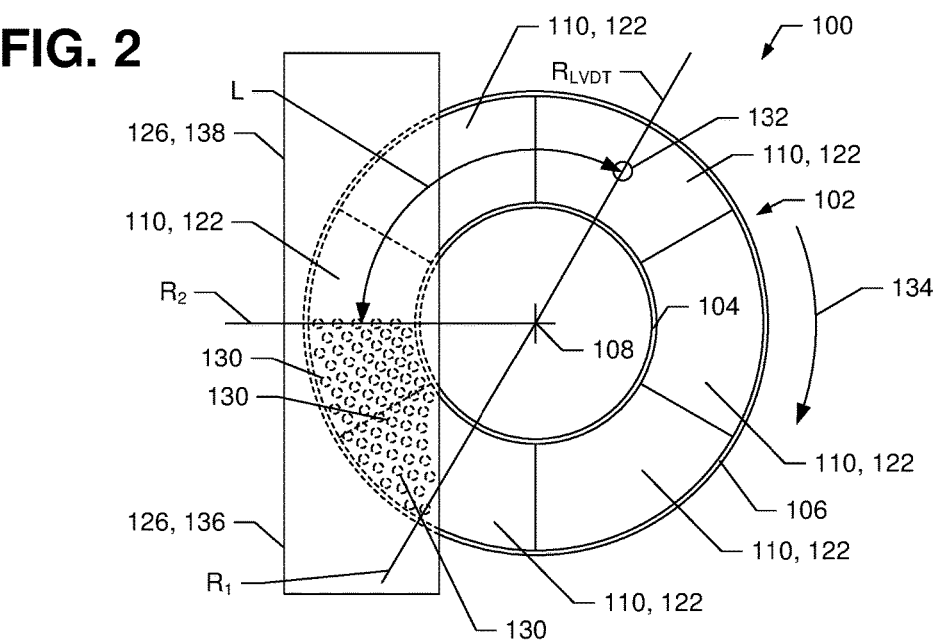

LOW DENSITY CLOTH PREFORM AND METHODS OF MANUFACTURING SAME

CROSS REFERENCE TO RELATED APPLICATION

This application claims the benefit of U.S. Provisional Application No. 61/829,653, filed May 31, 2013, which is incorporated herein in its entirety by this reference.

FIELD OF THE INVENTION

The present invention relates, generally, to the field of brake preforms and methods for manufacturing brake preforms.

BACKGROUND OF THE INVENTION

High-performance brake rotors for aircraft, automobiles, and other vehicles are sometimes manufactured by forming brake rotor preforms (also sometimes referred to herein as "preforms") from multiple layers of annular-shaped segments of woven and/or non-woven material having fibers extending in chordal, radial, or both directions. The segments are needled together in the vertical direction with a needling machine in an attempt to form a unitary structure from the layers of annular-shaped segments. Typically, the preforms are then carbonized by heating to a temperature of greater than 1,200 degrees Celsius in a non-reactive atmosphere. Subsequently, a carbon matrix is added to the preforms using a carbon vapor deposition (CVD) or resin infiltration process to make a carbon-carbon composite friction material. After heat treating in a furnace, the preforms are then machined to produce brake rotors.

The CVD process is capital-intensive and to add sufficient matrix material, the preforms must usually be subjected to multiple cycles of CVD processing that are lengthy in time. As compared to CVD, resin infiltration uses a relatively inexpensive source of carbon to add matrix material to preforms. Typically, the resin infiltration process provides for faster addition of carbon matrix material to preforms. However, resin infiltration of preforms requires the use of high pressure to force pitch into and within the preforms and, sometimes, the preforms blow apart or become delaminated during this process. In either process, matrix carbon is more easily and rapidly added with a lower density preform. And, the matrix carbon, whether formed by CVD or resin infiltration, is of lower cost than carbon fiber.

There is, therefore, a need in the industry for a brake rotor preform having a lower density that may be used in connection with a variety of processes to produce carbonized brake rotor preforms, and that resolves these and other problems, difficulties, and shortcomings associated with the manufacture of carbonized brake rotor preforms.

SUMMARY OF THE INVENTION

Broadly described, the present invention comprises a low density cloth preform, and apparatuses and methods for manufacturing the same. The low density cloth preform has a lower density than other preforms manufactured using prior apparatuses and methods, thereby rendering the low density cloth preform more amenable to the addition of matrix carbon thereto, including, without limitation, through the use of less expensive carbon sources and more rapid processes for adding matrix carbon. The apparatuses and methods for manufacturing the low density cloth preform comprise, but are not limited to, preform needling machines configured and preform needling processes operable to provide more uniform needling depth and to eliminate the need to use a greater needling depth.

In accordance with a first example embodiment, a needling machine is configured with a foam base of a resilient material having a rebound rate and atop which layers of preform material are stacked and needled by a plurality of barbed needles. The resilient material is selected and the barbed needles are geometrically arranged and positioned relative to a sensor for determining the elevation of the preform material's top surface, such that the top surfaces of the foam base and preform material have a sufficient amount of time to rebound substantially to their respective pre-needled elevations before encountering the sensor. Due at least in part to such selection, arrangement and positioning, the vertical deflection of the foam base and preform material caused by needling and the erroneous effects thereof on the sensor's output and needling depth are minimized such that a more uniformly needled preform is produced. Because the uniformity of needling throughout the preform is improved, the preform is needled to a lesser depth with the result being a preform having a lower density and being more suitable for the addition of matrix carbon thereto using more rapid methods and less expensive sources of carbon.

According to a second example embodiment, a needling machine is similarly configured to that of the first example embodiment with a foam base of a resilient material having a rebound rate and atop which layers of preform material are stacked and needled by a plurality of barbed needles. However, the barbed needles include a first plurality of barbed needles and a second plurality of barbed needles that provide respective first and second stages of preform needling. The resilient material is selected to have an appropriate rebound rate and the first and second pluralities of barbed needles are configured in separated areas along a path traveled by the preform and relative to a sensor for determining the elevation of the preform material's top surface, such that the top surfaces of the foam base and preform material have a sufficient amount of time to rebound at least partially toward their respective pre-needled elevations between the first and second stages of preform needling and substantially toward their respective pre-needled elevations before encountering the sensor. The vertical deflection of the foam base and preform material caused by needling and the erroneous effects thereof on needling depth are minimized at least in part by staging the preform's needling in first and second stages, thereby causing a more uniformly needled preform to be produced. Owing to the uniformity of needling, the preform is needled to a lesser needling depth such that a lower density preform results having enhanced suitability for the addition of matrix carbon thereto.

Other uses, advantages and benefits of the present invention may become apparent upon reading and understanding the present specification when taken in conjunction with the appended drawings.

BRIEF DESCRIPTION OF THE DRAWINGS

FIG. 1 displays a schematic, side view of certain components of a needling machine, in accordance with a first example embodiment of the present invention, during manufacture of a preform.

FIG. 2 displays a schematic, top plan view of the components of the needling machine of FIG. 1.

DETAILED DESCRIPTION OF THE DRAWINGS

Figure 4:
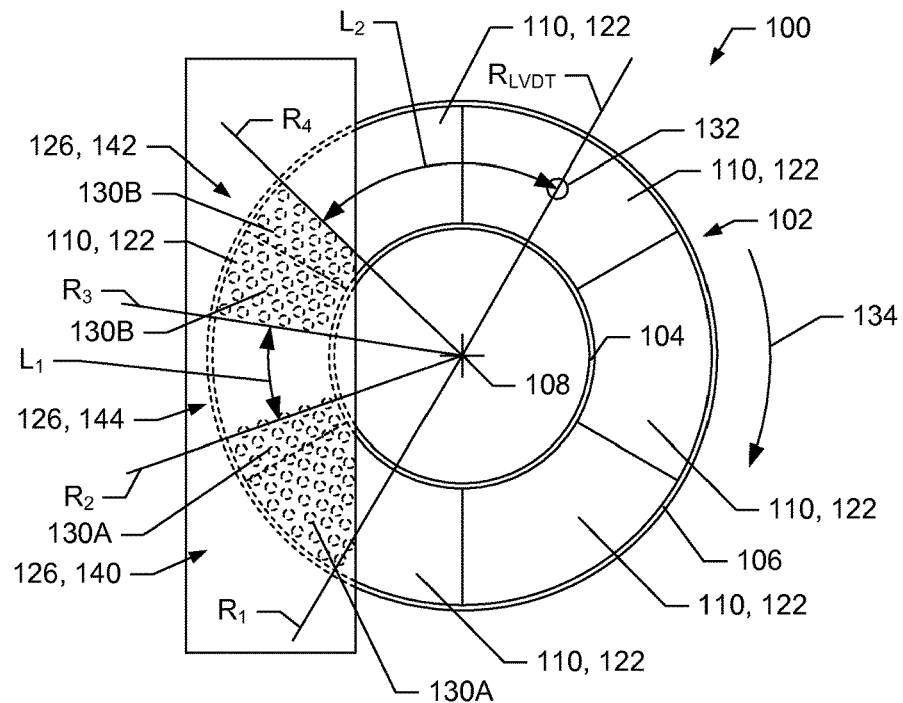
FIG. 4 displays a schematic, top plan view of the components of a needling machine, in accordance with a second example embodiment of the present invention, during manufacture of a preform.

Referring now to the drawings in which like numerals represent like elements or steps throughout the several views, FIG. 1 displays a schematic, side view of certain components of a needling machine 100, in accordance with a first example embodiment of the present invention, during manufacture of a preform. The needling machine 100 includes a bowl 102 having a vertical inner wall 104 and vertical outer wall 106 that form a body of revolution about a vertical axis 108. The bowl 102 defines an annular-shaped cavity (see FIG. 2) extending between the inner and outer walls 104, 106 for the receipt of multiple layers of annular-shaped segments 110 of preform material. The inner and outer walls 104, 106 are located at radii relative to the vertical axis 108 that are appropriate for the particular preform 112 then being made so as to snugly receive annular-shaped segments 110 of preform material therebetween and substantially limit horizontal movement of the segments 110. The bowl 102 also has a false bottom formed by a bottom plate 114 that is annularly-shaped and sized to translate vertically between the bowl's inner and outer walls 104, 106. A drive mechanism (not shown) is configured to raise and lower the bottom plate 114 during operation of the needling machine 100. The drive mechanism is also adapted to rotate the bowl 102 and bottom plate 114 (and, hence, the segments 110 and foam base 116 (described below)) about vertical axis 108 at a substantially constant rotational speed appropriate for consistent needling of segments 110. According to the example embodiments, an acceptable rotational speed is generally between 0.75 revolutions per minute (RPM) and 6.0 revolutions per minute (RPM).

The needling machine 100 also comprises a foam base 116 that has an annular-shape and that is sized to extend substantially between the bowl's inner and outer walls 104, 106. The foam base 116 sits atop the bottom plate 114 and is raised and/or lowered in unison with the bottom plate 114. The foam base 116 has an upper surface 118 and an opposed lower surface 120, and defines a thickness, T, therebetween. The upper surface 118 supports the annular-shaped segments 110 of preform material that are needled together by the needling machine 100 to form a brake rotor preform 122. The lower surface 120 rests on and adjacent to the bottom plate 114. According to the first example embodiment, the foam base 116 is manufactured from a foam material having a low density, resiliency, and/or a rebound rate such that when barbed needles 130 of the needling machine 100 penetrate and downwardly deflect portions of the upper surface 118 of the foam base 116 during needling of the annular-shaped segments 110 initially placed atop the foam base's upper surface 118, the deflection is minimized and any deflected portions of the foam base 116 rapidly return to their original non-deflected position and state. Such foam material may comprise a cross-linked polyethylene or similar semi-rigid material having a density in the range of 2.5 to 4.5 pounds per cubic foot, with densities between 3.0 and 3.5 pounds per cubic foot being most desirable. Also according to the first example embodiment, the foam base 116 may have a thickness, T, measuring generally between 0.75 inch and 3 inches, with a thickness, T, of 1.0 inch being most common.

Additionally, the needling machine 100 comprises a needling head 124 and a needling board 126 mounted to and vertically beneath the needling head 124. The needling head 124 is driven by a drive mechanism (not shown) that causes the needling head 124 and, hence, the needling board 126 to travel rapidly and repeatedly in vertically up and down directions as indicated by double-headed arrow 128. The needling board 126 has a plurality of barbed needles 130 securely mounted therein such that when the needling board 126 translates up and down, the barbed needles 130 move up and down through a fixed distance. During operation of the needling machine 100 and needling of the annular-shaped segments 110 of preform material to form the preform 122, the barbed needles 130 pull fibers of the uppermost segments 110 downward into segments 110 located beneath the uppermost segments 110 or into the foam base 116. By pulling fibers of the uppermost segments 110 into segments 110 beneath the uppermost segments 110, the uppermost segments 110 and lower segments 110 become interconnected and form a substantially unitary preform structure.

In addition, the needling machine 100 includes a linear variable displacement transducer 132 (also sometimes referred to herein as "LVDT 132") that is fixedly secured to other structure of the needling machine 100 above the bowl's annular-shaped cavity at a radial location, $R_{LVDT}$. During needling of the preform 122, the linear variable displacement transducer 132 has a fixed vertical elevation and is operative to continually measure the vertical distance, D, between the top surface of the then uppermost segments 110 of the preform 122 and the vertical elevation of the sensor of the linear variable displacement transducer 132. Upon determining this vertical distance, D, the linear variable displacement transducer 132 produces an output signal that causes the bowl's drive mechanism to raise or lower the bowl's bottom plate 114 in an attempt to maintain the top surface of the uppermost segments 110 of preform material consistently at the same vertical elevation.

FIG. 2 displays a schematic, top plan view of the components of the needling machine 100 of FIG. 1 and illustrates the spatial and geometric relationships therebetween. As seen in FIG. 2, the needling board 126 extends chordally over and relative to a portion of bowl 102 such that as the bowl 102 rotates clockwise during operation as indicated by arrow 134, the segments 110 of preform material within the bowl 102 rotate under the needling board 126 for needling. The barbed needles 130 are arranged in the needling board 126 generally along radii extending outwardly from vertical axis 108 with barbed needles 130 along adjacent radii being offset at different distances relative to vertical axis 108. Also, the barbed needles 130 are arranged so that the segments 110 of preform material are needled as the segments 110 pass under a first portion 136 of the needling board 126, but are not needled as the segments 110 pass under a second portion 138 of the needling board 126. In such arrangement, an arc length, L, is defined between the radial location, $R_{LVDT}$, at which the linear variable displacement transducer 132 is positioned and the radial location, $R_2$, of barbed needles 130 nearest the linear variable displacement transducer 132 along the arcuate path passing through the linear variable displacement transducer's location. The barbed needles 130 are arranged relative to the position of the linear variable displacement transducer 132 and the arc length, L, is selected so that the arc length, L, is maximized, thereby providing a maximum period of time for the upper surfaces of the foam base 116 and segments 110 to rebound upward after being deflected downward by the barbed needles 130 and before passing under the linear variable displacement transducer 132. The selection of arc length L is based at least on the density, resiliency and/or rebound rate of the foam base 116 and the rotational speed of the bowl 102.

During operation of the needling machine 100, the bowl 102 rotates clockwise as indicated by arrow 134 such that the segments 110 of preform material are rotated about vertical axis 108 and under the needling board 126. By virtue of the arrangement of the barbed needles 130 relative to the bowl 102 and, hence, to the segments 110 of preform material, the segments 110 begin to be needled and deflected downward by the barbed needles 130 as the segments 110 initially start passing under the first portion 136 of the needling board 126 at radial location $R_1$. As the bowl 102 rotates, the segments 110 continue to be needled and deflected downward by barbed needles 130 under the needling board's first portion 136 until the segments 110 begin to pass under the board's second portion 138 at radial location $R_2$. While the segments 110 are passing under the board's second portion 138, the segments 110 are not needled due to the absence of barbed needles 130, thereby allowing the upper surfaces of the foam base 116 and segments 110 to rebound upward to their non-deflected vertical elevations before passing under the linear variable displacement transducer 132.

Figure 3:
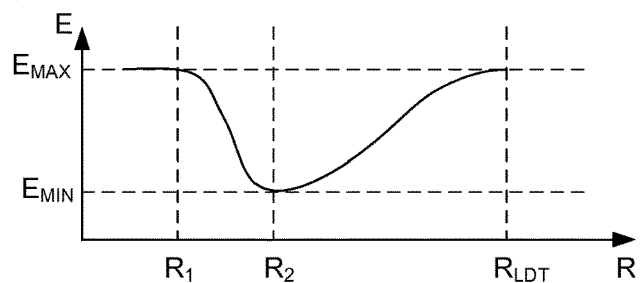
FIG. 3 displays a graphical view of the relationship between elevation of a preform's top surface and radial location during manufacture of the preform using the needling machine of FIG. 1.

The graph of FIG. 3 pictorially illustrates the effect of arranging the barbed needles 130, according to the first example embodiment, with the needling board's first portion 136 having barbed needles 130 and the second portion 138 having no barbed needles. In the graph, the vertical axis corresponds to the vertical elevation of the preform's top surface. The horizontal axis corresponds to various radial locations along the arcuate path traveled by each portion of the preform 122 during its clockwise rotation about vertical axis 108.

As seen in FIG. 3, the preform's top surface is at a maximum vertical elevation, $E_{MAX}$, between the radial location, $R_{LVDT}$, of the linear variable displacement transducer 132 and radial location $R_1$, where the preform's top surface begins to encounter the barbed needles 130. While passing under the needling board's first portion 136 between radial locations $R_1$ and $R_2$, the portion of the preform 122 and foam base 116 under the board's first portion 136 are needled, compressed, and/or deflected in a vertically downward direction such that the vertical elevation of the preform's top surface decreases to a minimum vertical elevation, $E_{MIN}$, at radial location $R_2$ as seen in FIG. 3. Then, once the preform 122 begins to pass under the needling board's second portion 138 where no needling occurs, the preform 122 and foam base 116 begin to rebound in an upward vertical direction with the vertical elevation of the preform's top surface increasing back to the maximum vertical elevation, $E_{MAX}$, prior to passing under the linear variable displacement transducer 132.

As a consequence of the foam base 116 being configured to minimize downward deflection thereof and the arrangement of barbed needles 130 on the needling board 126 enabling the foam base 116 and segments 110 of preform material to rebound before passing under the linear variable displacement transducer 132, the distance measured by the linear variable displacement transducer 132 to the top surface of the uppermost segments 110 is more constant and, therefore, the vertical movement of the bowl's bottom plate 114 and preform 122 is more consistent during needling of the preform 122. Because the vertical movement is more consistent and because the vertical travel of the barbed needles 130 is fixed, the depth of needling into the preform 122 is more uniform and consistent throughout the preform 122 and, hence, the existence of areas where the depth of needling is insufficient (which exist when other needling machines or methods are used) are substantially eliminated. By substantially eliminating such areas, vertically adjacent segments 110 of preform material are better connected or bonded together and the delamination of preforms is reduced significantly. Additionally, a more uniform depth of needling substantially eliminates the need to use a greater depth of needling (which tends to compress and pull vertically adjacent segments 110 of preform material closer together, thereby producing a more dense preform 122) for all barbed needles 130 in order to obtain better bonding and prevent delamination, thereby enabling the needling machine 100 to produce preforms 122 having lower densities suitable for subsequent use of a wider variety of processes to add a carbon matrix to the preforms 122.

FIG. 4 displays a schematic, top plan view of the components of a needling machine 100 according to a second example embodiment and substantially similar to the needling machine 100 of FIGS. 1 and 2. However, as seen in FIG. 4, the needling board 126 of the second example embodiment has an arrangement of barbed needles 130 that is different from the arrangement of barbed needles 130 in the first example embodiment. In the second example embodiment, the needling board 126 includes a first portion 140 having first plurality of barbed needles 130A depending therefrom, a second portion 142 having no barbed needles 130, and a third portion 144 having a second plurality of barbed needles 130B depending therefrom. The needling board's first, second and third portions 140, 142, 144 extend, respectively, between radial locations $R_1$ and $R_2$, radial locations $R_2$ and $R_3$, and radial locations $R_3$ and $R_4$. A first arc length, $L_1$, is defined between radial locations $R_2$ and $R_3$ along the arcuate path of the preform 122 extending therebetween. A second arc length, $L_2$, is defined along the arcuate path of the preform 122 extending between radial location $R_4$ and the radial location, $R_{LVDT}$, at which the linear variable displacement transducer 132 is positioned. According to the second example embodiment, the first plurality of barbed needles 130A and the second plurality of barbed needles 130B are substantial similar in length and configuration. Alternatively, in other example embodiments similar to the second example embodiment, the first plurality of barbed needles 130A may differ from the second plurality of barbed needles 130B in one or more characteristics such as, but not limited to, length, extension length from the needle board 126, and configuration. In still other example embodiments, some of the barbed needles 130 of the first or second pluralities of barbed needles 130A, 130B may have a first length, extension length from the needle board 126, or configuration, while other barbed needles 130 of the first or second pluralities of barbed needles 130A, 130B may have a second length, extension length from the needle board 126, or configuration.

The first and second pluralities of barbed needles 130A, 130B are separated relative to one another by the first arc length, $L_1$, such that the preform's needling is divided into first and second stages. The first arc length, $L_1$, is selected to provide a first period of time for the upper surfaces of the foam base 116 and preform segments 110 to rebound at least partially upward (and, more preferably, fully upward) after being deflected and compressed downward by barbed needles 130A. The second arc length, $L_2$, is selected to provide a second period of time for the upper surfaces of the foam base 116 and preform segments 110 to rebound fully upward after being deflected and compressed downward by barbed needles 130B and before passing under the linear variable displacement transducer 132. The selection of arc lengths $L_1$ and $L_2$ are based at least on the density, resiliency and/or rebound rate of the foam base 116 and the rotational speed of the bowl 102.

In accordance with the second example embodiment and substantially similar to the first example embodiment, the bowl 102 rotates clockwise as indicated by arrow 134 such that the segments 110 of preform material are rotated about vertical axis 108 and under the needling board 126 during operation of the needling machine 100. The segments 110 begin to be needled and deflected downward by the barbed needles 130A as the segments 110 initially start passing under the first portion 140 of the needling board 126 at radial location $R_1$. As the bowl 102 rotates and the first stage of needling progresses, the segments 110 continue to be needled and deflected downward by barbed needles 130A under the needling board's first portion 140 until the segments 110 begin to pass under the board's second portion 142 at radial location $R_2$. While the segments 110 are passing under the board's second portion 142, the segments 110 are not needled due to the absence of barbed needles 130, thereby allowing the upper surfaces of the foam base 116 and segments 110 to rebound at least partially upward before beginning to pass under the board's third portion 144 for the second stage of needling. The segments 110 begin to be needled and deflected downward by barbed needles 130B as the segments 110 initially start passing under the third portion 144 of the needling board 126 at radial location $R_3$. The segments 110 continue to be needled and deflected downward by barbed needles 130B of the needling board's third portion 144 until the segments 110 are no longer passing under the board's third portion 144. The upper surfaces of the foam base 116 and segments 110 rebound upward after passing under the board's third portion 114 and to their non-deflected vertical elevations before passing under the linear variable displacement transducer 132.

Figure 5:
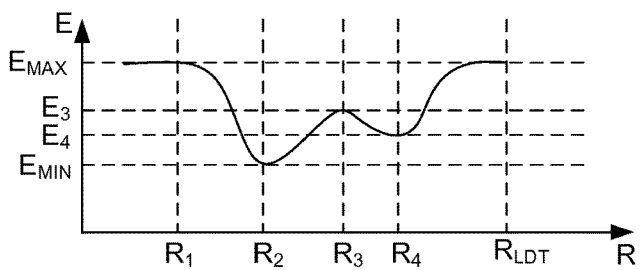
FIG. 5 displays a graphical view of the relationship between elevation of a preform's top surface and radial location during manufacture of the preform using the needling machine of FIG. 4.

The effect of arranging the barbed needles 130, according to the second example embodiment, so that the needling of the preform's segments 110 is divided into first and second stages is illustrated pictorially in the graph of FIG. 5. Similar to FIG. 3 described above, the graph's vertical axis corresponds to the vertical elevation of the preform's top surface. The horizontal axis corresponds to various radial locations along the arcuate path traveled by each portion of the preform 122 during its clockwise rotation about vertical axis 108.

The preform's top surface, as seen in FIG. 5, is at a maximum vertical elevation, $E_{MAX}$, between the radial location, $R_{LVDT}$, of the linear variable displacement transducer 132 and radial location $R_1$, where the preform's top surface begins to encounter the first stage of needling and barbed needles 130A. While passing under the needling board's first portion 140 between radial locations $R_1$ and $R_2$, the portion of the preform 122 and foam base 116 under the board's first portion 140 are needled, compressed, and/or deflected in a vertically downward direction such that the vertical elevation of the preform's top surface decreases to a minimum vertical elevation, $E_{MIN}$, at radial location $R_2$. Then, as the preform 122 begins to pass under the needling board's second portion 142 where no needling occurs, the preform 122 and foam base 116 begin to rebound in an upward vertical direction with the vertical elevation of the preform's top surface increasing partially back to the maximum vertical elevation, $E_{MAX}$, and to an intermediate vertical elevation, $E_3$, before beginning to pass under the board's third portion 144. As the preform 122 is needled during the second stage of needling while passing under the board's third portion 144, the portion of the preform 122 and foam base 116 under the board's third portion 144 are compressed and/or deflected in a vertically downward direction such that the vertical elevation of the preform's top surface decreases to a vertical elevation, $E_4$, at radial location $R_4$. Notably, vertical elevation $E_4$ is not as low as the minimum vertical elevation $E_{MIN}$. Upon exiting from under the needling board's third portion 144, the preform 122 and foam base 116 begin to rebound in an upward vertical direction with the vertical elevation of the preform's top surface increasing back to the maximum vertical elevation, $E_{MAX}$, prior to passing under the linear variable displacement transducer 132.

By virtue of the preform's needling being divided into two needling stages and of the foam base 116 being configured to minimize downward deflection thereof, the minimum vertical elevation of the preform's top surface reached during needling according to the second example embodiment is greater than the minimum vertical elevation of the preform's top surface reached during needling according to the first example embodiment. As a consequence, the foam base 116 and segments 110 of preform material rebound more readily than in the first example embodiment and before passing under the linear variable displacement transducer 132, resulting in more uniform needling, the use of a lesser needling depth for some or all of the barbed needles 130, and preforms 122 having lower densities as described above with respect to first example embodiment.

It should be appreciated and understood that, in other embodiments, the linear variable displacement transducer 132 may be positioned at a different location. It should also be appreciated and understood that the barbed needles 130 may be arranged, positioned and/or configured differently as long as their positions and arrangements provide sufficient time for the upper surfaces of the foam base 116 and segments 110 to rebound fully upward before passing under the linear variable displacement transducer 132 after being deflected downward by the barbed needles 130.

Whereas the present invention has been described in detail above with respect to example embodiments thereof, it should be appreciated that variations and modifications might be effected within the spirit and scope of the present invention.

What is claimed is:

1. A method for manufacturing a low density cloth preform, the method comprising the steps of:
   receiving cloth preform material atop a foam base that is resilient and has a density and thickness, wherein the cloth preform material has a top surface;
   rotating the cloth preform material at a rotational speed along an arcuate path about a vertical axis;
   needling the cloth preform material with a plurality of barbed needles depending from a needling board while the cloth preform is present beneath the needling board, wherein prior to needling the top surface has a first elevation and during needling the top surface is deflected downward to an elevation lower than the first elevation; and
   after needling, determining a second elevation of the top surface of the cloth preform material at a location along the arcuate path that is distant from the plurality of barbed needles by an arc length;

wherein the foam density, foam base thickness, rotational speed, and arc length are selected to cause the top surface of the cloth preform material to rebound in an upward direction after needling such that the second elevation substantially equals the first elevation by the time the cloth preform material rotates through the arc length.

2. The method of claim 1, wherein the rotational speed is in the range of 0.75 revolutions per minute to 6.0 revolutions per minute.

3. The method of claim 1, wherein the foam base has a thickness in the range of 0.75 inches to 3.0 inches.

4. The method of claim 1, wherein the foam base has a density in the range of 2.5 pounds per cubic foot to 4.5 pounds per cubic foot.

5. The method of claim 1, wherein the needling board comprises a first portion and a second portion nearest the location where the second elevation of the top surface of the cloth preform material is determined, and wherein all of the barbed needles of the plurality of barbed needles depend from the first portion of the needling board and none of the barbed needles of the plurality of barbed needles depend from the second portion of the needling board.

6. The method of claim 1, wherein the needling board comprises a first portion and a second portion nearest the location where the second elevation of the top surface of the cloth preform material is determined, and wherein the plurality of barbed needles includes a first plurality of barbed needles secured in the first portion of the needling board and a second plurality of barbed needles secured in the second portion of the needling board, and the first portion of the needling board is separated at a distance from the second portion of the needling board.

* * * * *